Nov. 1, 1938.　　　K. H. WYLIE　　　2,135,420
NUTCRACKER
Filed May 28, 1937　　　2 Sheets-Sheet 2

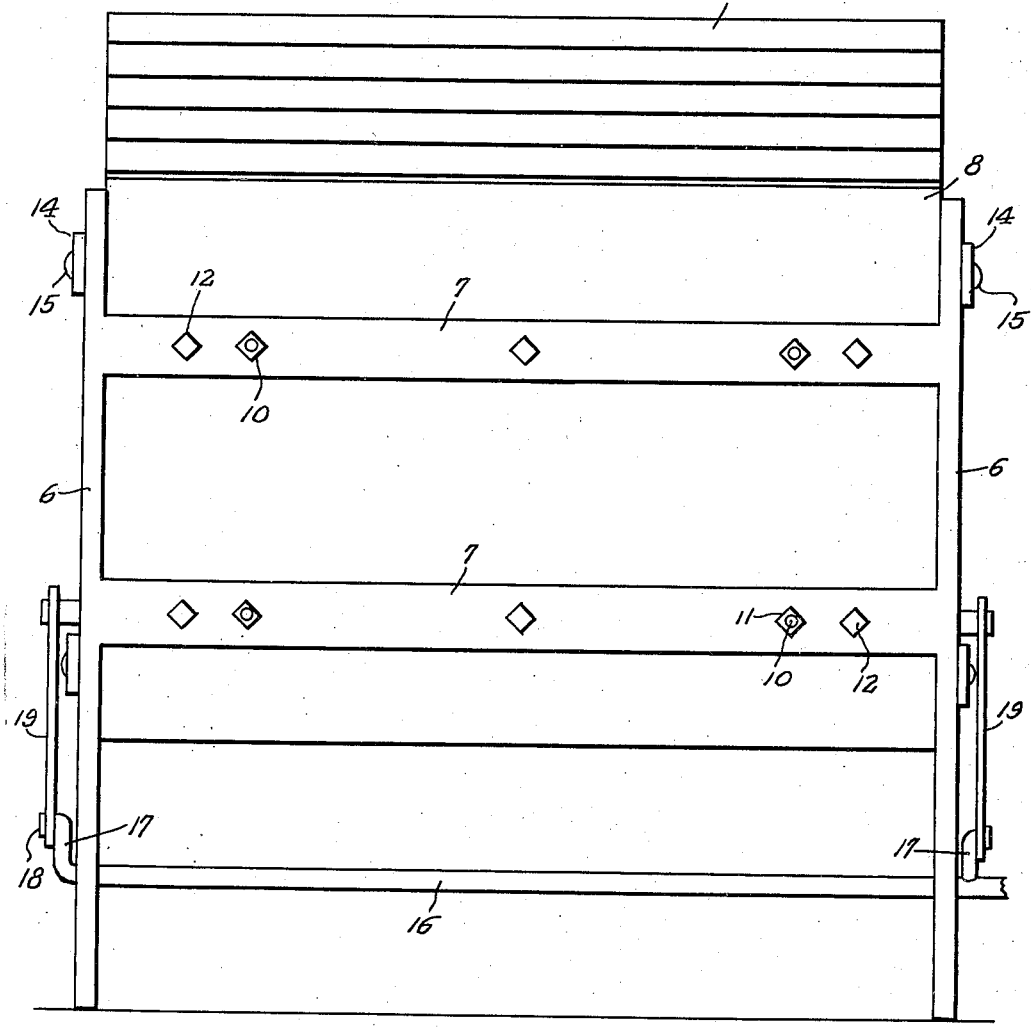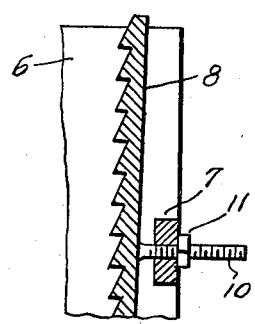

Inventor
Kenneth H. Wylie,

By Clarence A. O'Brien
Hyman Berman
Attorneys

Patented Nov. 1, 1938

2,135,420

UNITED STATES PATENT OFFICE 2,135,420

NUTCRACKER

Kenneth H. Wylie, Eugene, Oreg.

Application May 28, 1937, Serial No. 145,351

3 Claims. (Cl. 146—12)

This invention relates to devices for cracking nuts, and an object of the invention is to provide a nut cracker of such a construction, combination, and arrangement of parts, that during the cracking operation one of the jaws and the nut being cracked are moving relative to a complemental jaw, the nut rolling between the jaws so that a greater portion of the shell during the cracking of the nut is contacted by the jaws than where, as in the conventional nut cracker, the nut is usually held stationary between the jaws.

A further object of the invention is to provide a device for so cracking nuts that little if any damage will occur to the "meat" of the nut.

The invention, together with its objects and advantages will be best understood from a study of the following description taken in connection with the accompanying drawings, wherein:

Figure 1 is a rear elevational view of the nut cracker;

Figure 2 is a fragmentary detail sectional view through a stationary jaw forming part of the invention;

Figure 3:
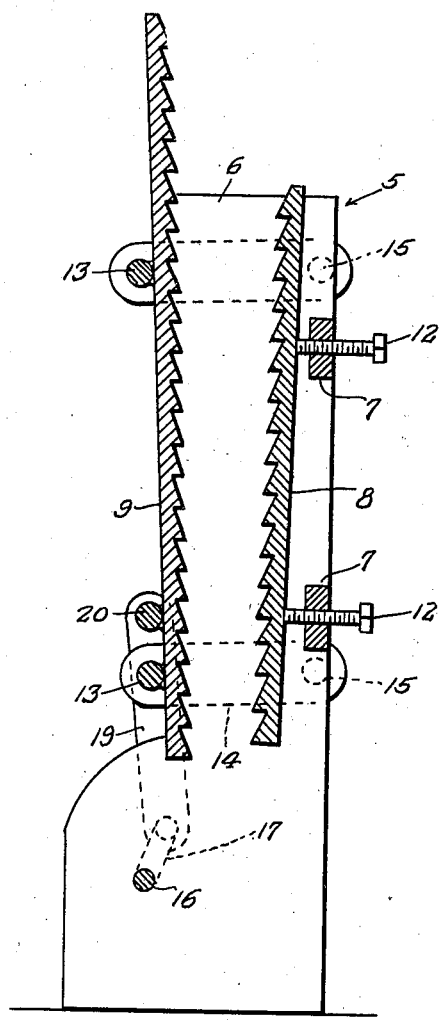
Figure 3 is a vertical sectional view through the cracker.
Figure 4:
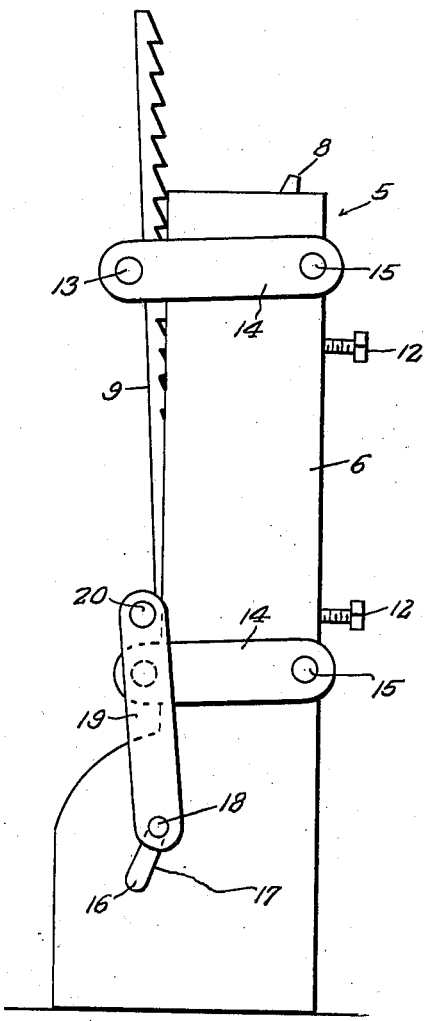
Figure 4 is an end elevational view of the cracker.

Referring to the drawings by reference numerals it will be seen that in the preferred embodiment thereof the cracker comprises a frame 5 consisting of a pair of end plates 6 connected at the rear side of the nut cracker by vertically spaced horizontal bars 7.

Mounted in the frame 5 between the ends 6 thereof are opposed jaws 8 and 9 respectively. Jaw 8 is disposed perpendicularly while jaw 9 is disposed at an angle to the perpendicular as clearly shown in Figure 3.

The jaw 8 has projecting from the rear face thereof threaded supporting studs 10 that work through suitable openings provided therefor in the bars 7 and are equipped with nuts 11 for the purpose of securing the jaw 8 at the desired position of adjustment relative to the jaw 9.

Threaded through the bars 7 are adjusting nuts 12 that at one end have bearing engagement with the jaw 8 for advancing the latter to the desired position of adjustment relative to the jaw 9.

The confronting faces of the jaws 8 and 9 are transversely ribbed or otherwise formed to provide roughened working surfaces as clearly shown in Figure 3.

Welded or otherwise secured to the front face of the jaw 9 are vertically spaced members projecting beyond the side edges of the jaw 9 and engaged in apertures provided in one end of links 14. The links 14 are provided in pairs at opposite ends of the frame 5 and are pivoted to the ends 6 of the frame adjacent the rear of the frame as at 15.

Extending between the lower ends of the end members 6 of the frame is a driven shaft 16, the ends of which are journaled in suitable openings provided therefor in the frame members 6. Shaft 16 is provided with crank arms 17 with which are engaged connecting rods 19.

At their free ends the connecting rods 19 are provided with openings which receive the ends of a third rod 20 welded or otherwise secured to the front face of the jaw 19 in slightly vertically spaced relation upwardly from the lowermost rod 13.

It will thus be seen that as shaft 16 rotates rectilinear motion will be transmitted to the jaw 9, and upon each downward stroke of jaw 9 the nut fed between the jaws 8 and 9 will be caused to roll downwardly between said jaws and as it approaches the lower ends of the jaws will have the shell thereof crushed, whereby the nut is effectively crushed in such a manner that the meat thereof discharges therefrom and is little if at all damaged by the crushing of the shell in the manner just stated.

In actual practice the nuts will be fed by gravity from a hopper or other suitable source of supply to the space between the jaws 8 and 9, entering the space between the jaws at the upper end of the frame. In connection with the above, it will be seen that as the jaw 9 moves upwardly and away from jaw 8, the cracked nut drops free of the jaws and into a sack or container (not shown), positioned in the bottom of the frame and relative to the jaws 8 and 9, so as to conveniently receive the cracked nut.

It will also be apparent that by adjusting the jaw 8 relative to the jaw 9 the nut cracker may be so adjusted as to adapt the same to the cracking of nuts of all sizes, shapes and types.

Further, it is believed that a clear understanding of the construction, utility and advantages of a nut cracker providing the features of the present invention will be had without a more detailed description.

Having thus described my invention, what I claim as new is:

1. In a nut cracker of the character described, a frame comprising a pair of end members, a plurality of horizontal bars connecting the rear edges of said members, a pair of opposed complemental jaws mounted in said frame, supporting means for one of said jaws including means projecting from the jaw and slidably inserted through the bars together with means threaded in the bars and abutting said one jaw for moving said one jaw to a desired position of adjustment relative to the other jaw and cooperating with said supporting means for securing said one jaw in the desired position of adjustment, means for supporting said other jaw within the frame for reciprocatory movement, and means for transmitting movement to the second mentioned jaw.

2. In a nut cracker of the character described, a frame comprising a pair of end members, a plurality of horizontal bars connecting the rear edges of said members, a pair of opposed complemental jaws mounted in said frame, supporting means for one of said jaws including means projecting from the jaw and slidably inserted through the bars together with means threaded in the bars and abutting said one jaw for moving said one jaw to a desired position of adjustment relative to the other jaw and cooperating with said supporting means for securing said one jaw in the desired position of adjustment, means for supporting said other jaw within the frame for rectilinear movement, and means for transmitting movement to the second mentioned jaw, said means including a driven shaft mounted in the lower end of the frame, and eccentric means operatively connecting said shaft with the second named jaw.

3. In a nut cracker of the character described, a frame comprising a pair of end members, a plurality of horizontal bars connecting the rear edges of said members, a pair of opposed complemental jaws mounted in said frame, supporting means for one of said jaws including means projecting from the jaw and slidably inserted through the bars together with means threaded in the bars and abutting said one jaw for moving said one jaw to a desired position of adjustment relative to the other jaw and cooperating with said supporting means for securing said one jaw in the desired position of adjustment, means for supporting said other jaw within the frame for rectilinear movement, and means for transmitting movement to the second mentioned jaw, said means including a driven shaft mounted in the lower end of the frame, eccentrically disposed crank pins on said shafts, and connecting rods connecting said crank pins with the second named jaw adjacent opposite edges of the second named jaw and upper and lower links pivoted at one end to the respective end members, the other end of said links being pivoted to the last named jaw at the opposite edges thereof to slidably maintain the jaw between said end members.

KENNETH H. WYLIE.